Feb. 20, 1934.    E. F. MAAS    1,948,304
ELASTIC WHEEL
Filed Sept. 14, 1929
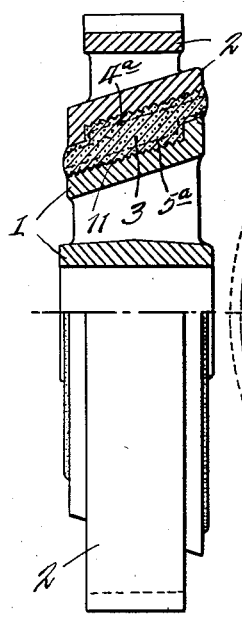
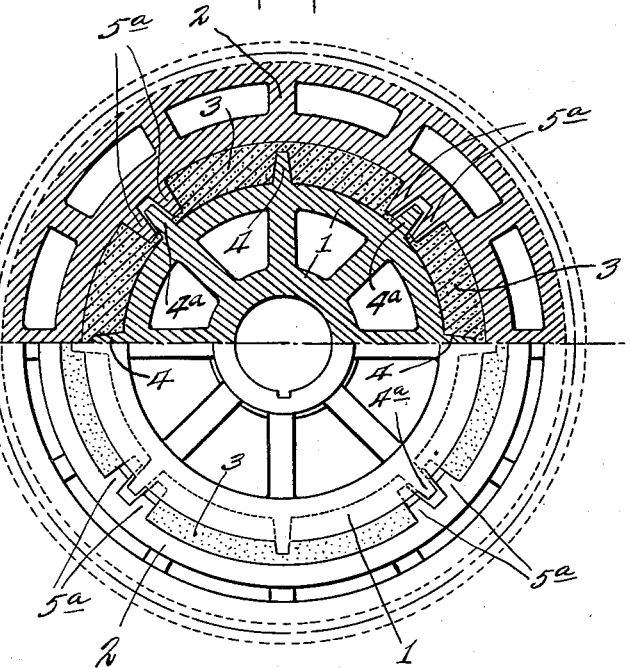
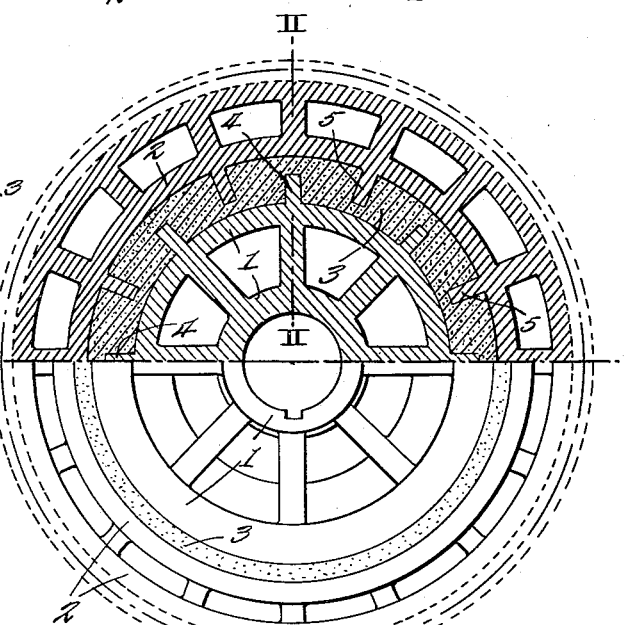
INVENTOR
ELOV F. MAAS Patented Feb. 20, 1934

1,948,304

UNITED STATES PATENT OFFICE 1,948,304

ELASTIC WHEEL

Elov F. Maas, Cuyahoga Falls, Ohio, assignor to Wingfoot Corporation, Wilmington, Del., a corporation of Delaware Application September 14, 1929
Serial No. 392,579

7 Claims. (Cl. 152—36)

This invention relates to certain improvements in elastic wheels, and particularly elastic wheels of the kind described and claimed in my prior Patent No. 1,648,413, granted November 8, 1927.

While reference may be made to said patent for a full disclosure of the invention covered thereby, it may be briefly stated that the elastic wheel disclosed in said patent comprises a hub portion and a rim portion both made of metal or other suitable hard material, between which there is no metallic or other hard and unyielding connection, the hub and rim portions being connected together by means of yieldable or cushioning material, consisting of rubber compound or other suitable elastic material, cured on to both the hub and rim portions so that the whole constituted a single and unitary structure.

An object of the present invention is to provide an improved form of elastic wheel intended to be used in cases where a high torque has to be transmitted by the wheel and where a cushioning feature in transmitting this torque would be of great benefit to all parts of the connected machinery or mechanism, moving parts as well as stationary parts. As examples of this class of wheel, locomotive drive wheels, drive gears for electric and gasoline rail coaches, and large gears for all classes of machinery, may be mentioned, without necessarily limiting the invention to these particular examples of wheels.

Another object of the invention is to provide arrangements for overcoming the otherwise harmful effects of excessive shrinkage of the elastic material when it cools down after the curing opertion, and to provide an elastic wheel in which the elastic material or rubber cushion is free from initial strains and has the maximum strength in its joints with the metal parts.

The invention is illustrated in the accompanying drawing, in which:—

Figure 1 is a side view of an elastic wheel constructed in accordance with the present invention, partly in elevation and partly in section on the line I—I of Figure 2, Figure 2 is an end view of the wheel shown in Figure 1, partly in elevation and partly in section on the line II—II of Figure 1, Figure 3 is a side view, similar to Figure 1, of a modified form of wheel, Figure 4 is an end view, similar to Figure 2, of the form of wheel shown in Figure 3.

Referring to the form of wheel shown in Figures 1 and 2, the wheel comprises a hub member 1, and a rim member 2, both of which members are made of metal or other suitable hard material. The annular hub member 1 is disposed within the annular rim member 2 so as to leave an annular space between the outer surface of the hub member and the inner surface of the rim member.

Within the space between the outer surface of the hub member 1 and the inner surface of the rim member 2 is disposed an annular member or mass 3 of elastic or cushioning material, for example, a rubber compound. In the manufacture of the wheel, this rubber compound or other elastic material is cured on to the surfaces of the hub and rim members, so that it is securely united to such members at said surfaces, and the completed wheel constitutes in effect a single and unitary structure, which nevertheless includes a resilient or cushioning element permitting relative yielding movements of the rim and hub members, not only radially but also laterally of the wheel structure.

The hub member 1 is provided at suitably spaced points about its outer surface, with a plurality of fins or blades 4, projecting substantially radially outwardly therefrom, and the rim member 2 is provided at similarly spaced points about its inner surface with similar fins or blades 5 projecting substantially radially inwardly therefrom. Each fin or blade 5 is arranged midway between a pair of fins or blades 4, as shown in Figure 1.

During the curing of the rubber compound or other elastic material on to the outer and inner surfaces of the hub and rim members, said compound or material is also cured on to the surfaces of the fins or blades 4 and 5 and is united thereto. Consequently there is interposed between each pair of fins or blades 4 and 5 a mass of elastic or cushioning material which is united to these fins or blades. Thus the torque to be transmitted will be carried from the hub member to the rim member, or vice versa, by means of both compression and tension in the cushioning material interposed between the members and between the projecting fins or blades thereof. That is, assuming that the hub member is driven, the material ahead of the blades 4 in the direction of rotation will be placed under compression and the material behind the blades will be placed under tension, and both the compressed and tensioned material will be effective in transmitting the torque from the hub member to the rim member.

There is thus provided a construction of elastic wheel capable of transmitting a high torque, while at the same time a cushioning feature is introduced which is obviously of great advantage.

In some cases it may be desired to limit the motion permitted to occur between the hub member and the rim member, and this can be done by a construction such as shown in Figures 3 and 4. In the construction shown in these figures, the hub and rim members are generally substantially the same as in the construction shown in Figures 1 and 2, and the rubber compound or other elastic material is similarly disposed between and cured on to and united to the inner and outer surfaces of the members. The hub member 1 is similarly provided with outwardly projecting fins or blades, suitably spaced apart about its outer surface, and to facilitate description, the alternate blades are designated by numerals 4 and 4a. The rim member 2 is also provided with fins or blades 5a projecting substantially radially inwardly from its inner surface. Instead of these fins or blades 5a being disposed midway between the fins or blades of the hub member, as are the fins or blades 5 as shown in Figure 1, they are arranged in pairs as shown in Figure 3, the blades of each pair being disposed at opposite sides of a blade 4a of the hub member, with the adjacent surfaces of the pair of blades 5a spaced from the surfaces of the blade 4a. It will be noted that there is no elastic material between the faces of each pair of blades 5a and the faces of the blade 4a therebetween, so that the relative movement between the hub member and rim member will be limited by the engagement between one or other of each pair of blades 5a and the corresponding blades 4a according to the direction of the relative movement. Between each of the remaining blades 4 of the hub member and the blades 5a at opposite sides thereof elastic material is interposed and is united to these blades, and this elastic material transmits the torque by compression and tension in the manner described with reference to the construction shown in Figures 1 and 2, but the relative movement is limited by the metal to metal contact of the blades 4a with the blades 5a as above described. It will be understood that the distance between the faces of each of the blades 4a and the faces of the blades 5a can be made as large or as small as desired dependent upon the amount of relative movement which it is desired to permit, according to the purposes or conditions of use of the wheels.

It will be noted from Figures 2 and 4 that the inner and outer surfaces of the rim and hub members are inclined with reference to the plane of the wheel, and this is done for practical reasons in manufacturing the wheels and for the purpose of overcoming the harmful effects which might be caused due to excessive shrinkage of the elastic material when it cools down after the curing operation. The aforesaid result is obtained by subjecting the elastic material while cooling after curing to compression and diminution of volume such as to compensate for the excessive shrinkage of said material over that of the rim and hub members. The said compression and diminution of volume is effected by relative lateral movement of the hub and rim members, and due to the parallel inclined surfaces of these members such movement has this effect.

The inner and outer surfaces of the rim and hub members may be corrugated as shown at 11 in Figure 4, or otherwise formed in order to increase the surface between the rubber and metal parts. In Figure 2 the surfaces are shown as provided with annular projections 12 for this purpose.

The invention is not limited to any particular type or form of wheel, although Figures 1–4 show the invention applied to a toothed gear wheel. The invention is applicable to other types of wheels, and particularly to wheels such as railroad wheels in which high torque has to be transmitted.

What I claim and desire to secure by Letters Patent is:—

1. An elastic wheel, comprising a hub member, a rim member, parts projecting radially in pairs from one of said members into the space between said members, parts projecting radially, from the other member into said space, certain of the projecting parts of the second member being each arranged between and spaced a predetermined distance from a pair of projecting parts of the first member, and cushioning material interposed between said members and between the remaining projecting parts of the second member and projecting parts of the first member at opposite sides thereof, and united to said members and parts.

2. An elastic wheel, comprising a hub member and a rim member, having the outer surface of the hub member and the inner surface of the rim member similarly inclined with respect to the plane of the wheel, and elastic material interposed between said surfaces of said members and united to said members, and substantially free from initial strains.

3. An elastic wheel, comprising a hub member and a rim member having the outer surface of the hub member and the inner surface of the rim member of conical form and substantially parallel and coaxial with each other, and elastic material interposed between said surfaces and united to said members and substantially free from initial strains.

4. A resilient torque transmitting device including a hub member and a rim member, said members being connected together in spaced relation by an annular body of elastic material, one of said members having a plurality of pairs of radial vanes extending into the elastic material, the other member having radial blades, each of the last-named blades extending between one of the pairs of the vanes on the other member, and additional blades on the bladed member extending into the elastic body in spaced relation to the pairs of vanes on the first-named member.

5. A resilient torque transmitting device including a hub member and a rim member, said members being connected together in spaced relation by an annular body of elastic material, one of said members having a plurality of pairs of radial vanes extending into the elastic material, the other member having radial blades, each of the last-named blades extending between one of the pairs of the vanes on the other member.

6. A cushion wheel comprising a pair of concentric members, a rubber body vulcanized between the members and securing the same together, a plurality of circumferentially spaced, radially directed blades on one of the members, a plurality of pairs of vanes on the other member each pair of vanes being adapted to receive a blade, the blades when the wheel is under no loads being air-spaced a substantially uniform distance from all portions of the vanes but being adapted to contact with portions of the vanes on overloads to prevent falure of the rubber body.

7. A wheel of the class described comprising inner and outer annular members concentrically disposed in a common plane but spaced from each other, the adjacent peripheries of said members being axially inclined, and a body of rubber compound substantially filling the space between said annular members and secured thereto by vulcanization, the rubber compound being substantially free from initial strains.

ELOV F. MAAS.